April 16, 1946.  B. E. SHAW  2,398,452
THREE-WAY SOLENOID VALVE
Filed March 17, 1942
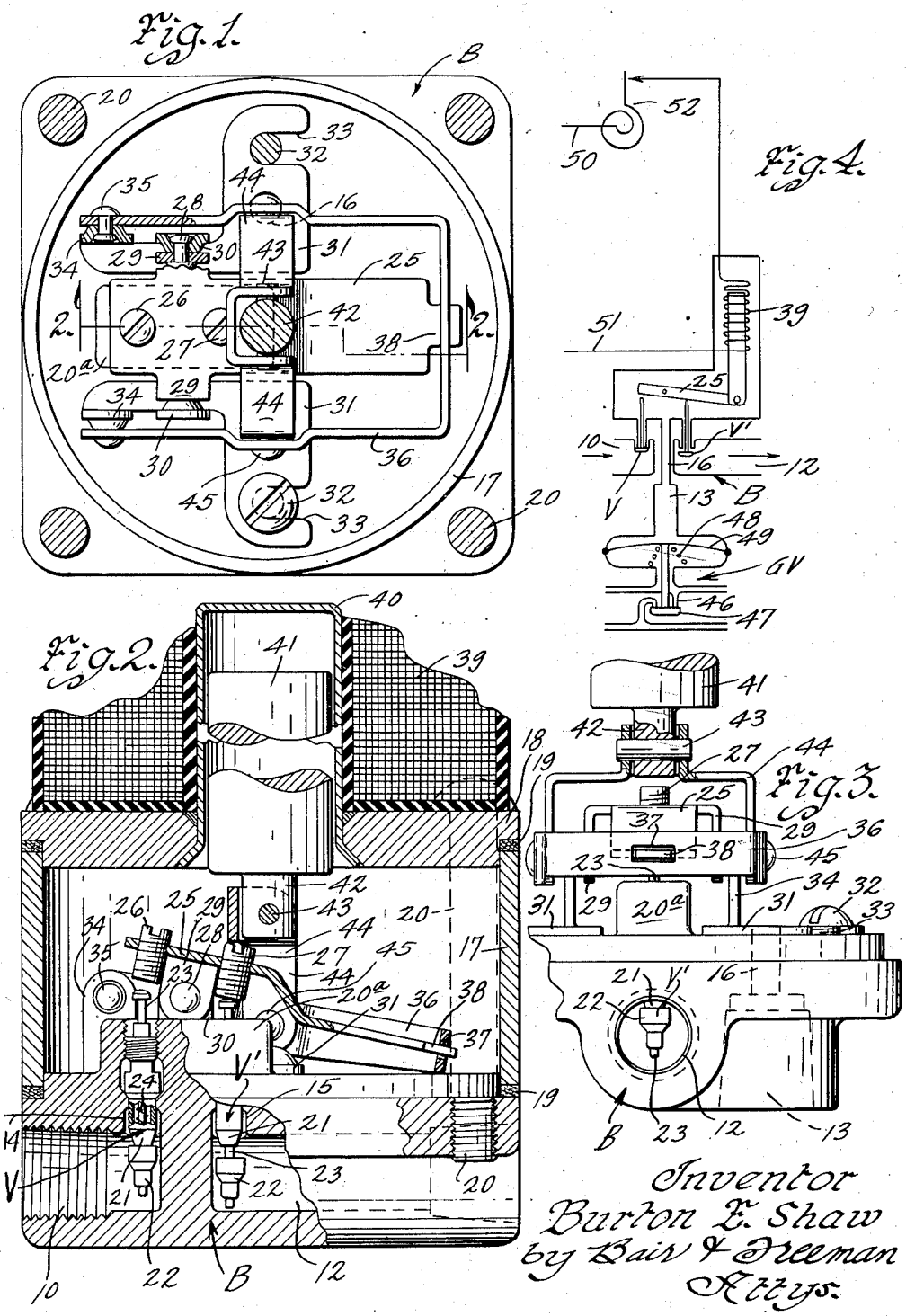
Inventor
Burton E. Shaw
by Bair & Freeman
Attys.

Patented Apr. 16, 1946

2,398,452

UNITED STATES PATENT OFFICE 2,398,452

THREE-WAY SOLENOID VALVE

Burton E. Shaw, Bristol, Ind., assignor to Penn Electric Switch Co., Goshen, Ind., a corporation of Iowa Application March 17, 1942, Serial No. 435,048

3 Claims. (Cl. 137—144)

My present invention relates to a three-way solenoid valve of the type adaptable for controlling compressed air, steam or other fluid pressure to and from a control device, such as a diaphragm operated valve.

One object of the invention is to provide a valve of this general character, which is simple to manufacture and has a number of advantages from a servicing standpoint.

More particularly, it is an object of the present invention to provide a valve structure utilizing "Schraeder" valves or the kind usually used for automobile inner tubes, such valves being relatively inexpensive and easily obtainable.

A further object is to provide a construction which permits ready replacement of the valves and ready adjustment of the operating structure to any valves that may vary in dimensions.

Still a further object is to provide a valve structure which has a pair of valve units operating to control a three-way pasageway system instead of the usual type wherein one valve unit of more complicated construction is used and arranged to seat on one or another of two seats, the present arrangement involving the use of two valve units, each including a valve plug normally closed, as by spring pressure, against its individual seat and operable in its other position to merely be spaced from the seat to permit fluid flow.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a plan view of a three-way valve structure embodying my invention, showing the solenoid thereof removed and tie bolts and a portion of the solenoid plunger in section;

Figure 2 is a partial sectional view as on the line 2—2 of Figure 1;

Figure 3 is an end elevation looking at the right hand end of Figure 2, the housing and solenoid being removed and portions of the valve body being broken away; and Figure 4 is a diagrammatic view showing one use for my three-way solenoid valve.

On the accompanying drawing I have used the reference character B to indicate generally a valve body. The body B is in the form of a square plate provided with suitable projections to accommodate an intake passageway 10, an exhaust passageway 12 and an intermediate passageway 13. The passageways 10, 12 and 13 may be suitably threaded internally to receive pipes or copper tube fittings, and each one communicates with the top of the valve body B through vertical bores 14, 15 and 16, respectively. The communication at this point is to the interior of the housing formed by a cylinder section 17 and a top plate 18.

The cylinder section 17 is sealed relative to the body plate B and the top plate 18 by means of gaskets 19 and tie bolts 20. Thus the interior of the cylinder 17 is completely sealed off from atmosphere and communicates with the three passageways 10, 12 and 13. The passageways 10 and 12 are normally sealed off from the interior of the cylinder or housing 17, however, by valve units V and V'. The valve units V and V' are removably mounted in a boss 20 of the valve body B, as by the usual screw-threaded method. The valve units V and V' are tire cores, usually known as "Schraeder" valves. These valve units include, briefly, a seat 21, a plug 22, a stem 23 and a spring 24. The spring 24 normally retains the plug 22 seated against the seat 21.

The valves V and V' are mounted in the boss 20ᵃ so that one may be open while the other is permitted to close by a particular position of a lever 25. The lever 25 carries a pair of set screws 26 and 27 for engagement with the stems 23 of the respective valves V and V', and the lever is pivotally mounted on rivets or the like 28. The rivets 28 extend through down-turned ears 29 of the lever 25 and through up-turned ears 30 of bracket members 31. The bracket members 31 are removably positioned on the upper surface of the body B by screws 32 which pass through notches 33 of the brackets 31.

The brackets 31 also have upstanding ears 34 which support rivets 35. The rivets 35 are provided as a pivot for one end of a U-shaped lever 36 which at its opposite end has a rectangular opening 37. The lever 25 has a reduced portion 38 extending through the opening 37 to serve as an operative connection between the levers 25 and 36. The rivets 28 and 35, it will be noted, are countersunk in embossments of the ears 30 and 34.

For operating the valves V and V', I provide a solenoid coil 39. The coil 39 is supported on the top plate 18 and on a tube 40 which is soldered into the plate 18 and sealed relative thereto by the solder. The tube 40 has a closed upper end. In the tube 40 a plunger 41 is slidably mounted. The plunger 41 has a reduced lower end 42 connected by a pivot pin 43 to a yoke member 44. The yoke member 44 has its arms pivoted to the lever 36 by a pair of rivets 45.

The three-way valve structure illustrated has a number of uses, one of which is illustrated in Figure 4. In this figure a diaphragm chamber of a gas valve GV is connected to the intermediate passageway 13. The valve GV has a seat 46 against which a valve plug 47 is normally seated under the bias of a spring 48. The diaphragm of the valve GV is indicated at 49, and when fluid pressure is introduced on top of it, effects spacing of the valve plug 47 from the seat 46 against the bias of the spring 48.

The solenoid coil 39 is illustrated as connected with supply wires 50 and 51, with a room thermostat or the like as a controlling switch in the line.

Practical operation

In the operation of my valve structure, when the solenoid 39 is deenergized, the valve V' is open and the valve V is closed, as shown in Figures 2 and 4. Accordingly, fluid pressure is exhausted from the space in the valve GV above the diaphragm 49 by passage through 13, 16 and 17, and then through the valve V' and the exhaust passageway 12 to the point of exhaust, which may be atmosphere in the case of compressed air, or the sewer or a reservoir tank in the case of steam. When the solenoid coil 39 is energized, then the plunger 41 is raised, thereby swinging the lever 36 upwardly to raise the reduced end 38 of the lever 25. This raises the adjusting screw 27 and lowers the adjusting screw 26 to permit the valve V' to close and at the same time to open the valve V in an obvious manner. Fluid pressure is now admitted from the intake 10 through the valve V into the cylinder 17, and from there through passageways 16 and 13 to the diaphragm chamber of the gas valve GV. This effects depression of the diaphragm 49 to space the valve plug 47 from the seat 46, thereby permitting gas flow through the valve GV.

The valves V and V' may be readily renewed by removing the top plate 18 and the cylinder 17 after removing the tie bolts 20. The two screws 32 may then be loosened slightly, which permits the brackets 31 to be slid toward the left, and the entire assembly of levers 25 and 36, together with the plunger 41, may then be moved out of the way to gain access to the valves V and V'. After they are renewed, and the brackets 31 replaced, the adjusting screws 26 and 27 may be adjusted, if necessary, and, finally, the cylinder 17 and the top plate 18 replaced. The arrangement is such that three-way valve operation is secured by the use of two valve units each having only a closed and open position instead of providing a single valve plug movable between two seats, as in the usual three-way valve construction.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A three-way solenoid valve comprising a valve body having an intake passageway, an exhaust passageway and an intermediate passageway, a housing over the top of said valve body, a pair of normally closed valve units removably inserted in the top of said valve body and communicating at their lower ends with said intake and exhaust passageways and at their upper ends with the interior of said housing, a solenoid supported by said housing in alignment with said valve body, a plunger movable by energization of said solenoid, and operative means of connection between said plunger and said valve units to open one unit and close the other one when the solenoid is energized and to open said other valve unit and close said one valve unit when the solenoid is deenergized, said means comprising a lever having one end pivoted to said valve body, said plunger being pivoted to said lever intermediate its ends and a secondary lever for said valve units pivoted to said valve body and operatively connected with the other end of said first lever, both of said levers being enclosed in said housing.

2. A three-way valve comprising a valve body having an intake passageway and an exhaust passageway, a housing over the top of said valve body, a pair of normally closed valve units in the top of said valve body and communicating at their lower ends with said intake and exhaust passageways and at their upper ends with the interior of said valve body communicating with the space in said housing and thereby with the upper ends of said valve units, a solenoid supported by said housing, a plunger movable by energization of said solenoid, a compound lever system pivoted in said housing, and operative means of connection between said plunger and said lever system to open one valve unit by engagement of a lever of said lever system therewith and close the other valve unit when the solenoid is energized and to open said other valve unit by engagement of said lever therewith and close said one valve unit when the solenoid is deenergized, said compound lever system and said operative means of connection comprising a lever having one end pivoted to said valve body, said plunger being pivoted to said lever intermediate its ends, and a secondary lever for said valve units, pivoted to said valve body and operatively connected with the other end of the first lever, both of said levers being enclosed in said housing.

3. A three-way solenoid valve comprising a valve body having an intake passageway, an exhaust passageway and an intermediate passageway, a pair of normally closed valve units in said valve body and communicating with said intake and exhaust passageways and both communicating with said intermediate passageway, a solenoid, a plunger movable by energization thereof, and operative means of connection between said plunger and said valve units comprising a lever having one end pivoted to said valve body, said plunger being pivoted to said lever intermediate its ends, and a secondary lever for said valve units, pivoted to said valve body and operatively connected with the other end of the first lever, both of said levers being enclosed in said housing, said last means effecting the opening of one valve unit and the closing of the other one when the solenoid is energized, and the opening of said other valve unit and the closing of said one valve unit when the solenoid is deenergized.

BURTON E. SHAW.